United States Patent
Raspanti

(10) Patent No.: US 6,512,045 B2
(45) Date of Patent: Jan. 28, 2003

(54) BUILD-UP SUPPRESSING COMPOSITIONS AND THE USE THEREOF IN POLYMERIZATION PROCESSES

(75) Inventor: Giuseppe Raspanti, Bergamo (IT)

(73) Assignee: 3V Sigma S.p.A., Milan (IT)

( * ) Notice: Subject to any disclaimer, the term of this patent is extended or adjusted under 35 U.S.C. 154(b) by 39 days.

(21) Appl. No.: 09/735,508

(22) Filed: Dec. 14, 2000

(65) Prior Publication Data

US 2002/0166992 A1 Nov. 14, 2002

(30) Foreign Application Priority Data

Dec. 17, 1999 (IT) .......................... MI99A2621

(51) Int. Cl.$^7$ .......................... C02F 5/10; C08L 27/06; C08L 31/04; C09D 5/16
(52) U.S. Cl. .......................... 524/832; 106/2; 252/180; 422/241
(58) Field of Search .......................... 252/180; 106/2; 524/832; 422/241

(56) References Cited

U.S. PATENT DOCUMENTS

| | | | | |
|---|---|---|---|---|
| 2,749,305 A | * | 6/1956 | Jursich ................... | 252/180 X |
| 3,130,153 A | * | 4/1964 | Keller, Jr. ............... | 252/180 X |
| 4,200,712 A | * | 4/1980 | Cohen .................... | 422/241 X |
| 4,980,079 A | * | 12/1990 | Yamato et al. ............. | 252/180 |
| 5,147,455 A | * | 9/1992 | Watanabe et al. ........... | 106/2 |
| 5,322,635 A | * | 6/1994 | Hieatt et al. ............. | 252/180 X |

FOREIGN PATENT DOCUMENTS

| | | |
|---|---|---|
| EP | 0695761 A | 2/1996 |
| GB | 2338712 A | 12/1999 |
| JP | 11060613 A | 3/1999 |
| WO | WO9824820 A | 6/1998 |

* cited by examiner

*Primary Examiner*—Richard D. Lovering
(74) *Attorney, Agent, or Firm*—Birch, Stewart, Kolasch & Birch, LLP

(57) ABSTRACT

Build-up suppressing compositions, comprising:

a) at least one condensation product between an aldehyde, a phenol compound and an aromatic hydroxycarboxylic acid, or at least one condensation product between formaldehyde and an optionally substituted alpha-naphthol, and b) at least one polycarboxylic acid.

13 Claims, No Drawings

BUILD-UP SUPPRESSING COMPOSITIONS AND THE USE THEREOF IN POLYMERIZATION PROCESSES

The present invention relates to build-up suppressing compositions, which are capable of preventing the formation of build-up in vinyl acetate or vinyl chloride polymerization processes, or in polymerization processes utilizing a mixture thereof, with or without other monomers or polymers polymerizable therewith, which processes are effected in aqueous suspension, aqueous emulsion or in bulk.

Build-up formation ("scale") is known to be one of the major problems with all of the polymerization processes cited above. In fact, part of the formed polymer tenaciously adheres to the reaction system inner walls, particularly the reactor walls, thus forming build-up with deleterious effects toward both the final product itself, due to small fragments of build-up which, when detached from the reactor walls, can be included in the polymerized product thus worsening its quality, and the safety of the reaction as the build-up slows the thermal exchange of the wall giving rise to safety problems due to overheating.

This build-up adversely affects the polymerization operations making it necessary to clean the walls after each run.

This cleaning is costly as it decreases the plant output and is dangerous for the operators due to the toxicity of the monomers, particularly vinyl chloride.

A number of products and techniques have been developed to mitigate this problem, all of which are based on coating the reactor walls with products which should inhibit adhesion of the build-up or even its formation, for example by preventing the polymerization of the monomers on the reactor walls. Phenol-formaldehyde condensation products (GB 1439339; JP 54-107991; CA 1181899; EP 0052421) or dye mixtures (alizarin, xanthones, natural flavonoids, naphthoquinones, hydroxyanthraquinones and others) with film-forming elements such as polysaccharides, polyvinyl alcohols, polyvinylpyrrolidone were proposed as reactor wall coating. See for example JP 04342701; JP 04154804; JP 04154801; JP 04154805; JP 04108805; JP 04159302 and JP 04031402.

EP 0 614 915 suggests the use of condensation products between quinones and heterocyclic compounds having at least two amino groups, whereas in EP 0 606 013 there are described, inter alia, condensation products between quinones and particular diamino-diphenyls substituted with carboxylic or sulfonic groups. EP 0 695 761 discloses the use of products obtained by condensing a "phenol" compound, such as phenol or 1-naphthol, in the presence of an aliphatic bicarboxylic acid. Finally, WO 98/24820 discloses compounds obtained by condensation of aldehydes, hydroxylated aromatic carboxylic acids and phenol compounds, which apparently have remarkable anti build-up characteristics.

The products more widely used seem to be those described in EP B1 0 052 421. However, although remarkable results as to suppression of build-up formation are achieved, those agents do not allow carrying out an appreciable number of repeated polymerizations if not by applying them to the reaction system inner walls before each run.

All these build-up suppressing agents can be applied in a number of manners, which depend on the nature of the product and on its capacity of adhering to the reactor walls.

The more common methods comprise coating by painting or spraying, in which case it shall be necessary to prepare suitable solutions of the same products, for example aqueous solutions. In case of spraying, nitrogen or water vapour at 5–15 bar pressures can be used as propellant.

As stated above, the performances of these products can be enhanced with the use of film-forming agents, such as polysaccharides or highly hydroxylated polyvinyl alcohols.

It has now been found that compositions based on particular build-up suppressing agents are surprisingly effective in remarkably suppressing the formation of build-up in the polymerization processes of vinyl chloride or vinyl acetate, or mixtures thereof, in the presence or in absence of other monomers or polymers polymerizable therewith.

Therefore, an object of the present invention comprises build-up suppressing compositions containing:
  a) at least one product deriving from the condensation of an aldehyde (A), a phenol compound (B) and an aromatic carboxylic acid hydroxylated on the aromatic nucleus (C);

or
  at least one product deriving from the condensation between formaldehyde, or a precursor thereof, and a compound of formula (I)

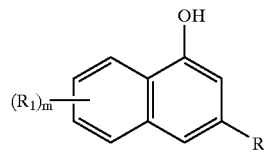

(I)

in which m is 1, 2 or 3, and R and $R_1$ are independently selected from hydrogen, halogen, $(C_{1-5})$alkyl, hydroxyl and carbo$(C_{1-5})$alkoxyl; and
  b) at least one polycarboxylic acid, optionally having on the non carboxylic carbon atoms 1 to 3 radicals independently selected from halogen atoms and the groups OR—$R_4$ and NH—$R_5$, in which $R_4$ and $R_5$ are independently hydrogen, $(C_{1-6})$alkyl or a $C_1$–$C_6$ acyl group, or the alkali metal salts thereof.

The build-up suppressing activity of these compositions is particularly high, often even synergistic. In fact, the use thereof provides better results than those attained upon application of the single components a) or, conversely, the same effects can be obtained by using lower amounts of the compositions of the invention. It has been observed that the compositions of the present invention are capable of suppressing almost completely the formation of build-up on the inner walls of the reactor and, in general, of the polymerization system, thus allowing to carry out repeated polymerizations without need for the compositions to be applied before each single run, always providing the desired effect, namely a substantial absence of build-up.

A further favorable characteristic of the compositions of the invention is that they have reduced sensitivity to pH changes in the polymerization processes.

Furthermore, the obtained polymers have better physical characteristics.

A further object of the present invention is the use of one or more of the above build-up suppressing compositions in the polymerization processes of vinyl chloride or vinyl acetate, or mixtures thereof, in the presence or in the absence of other monomers or polymers polymerizable with them.

Still another object of the present invention is a method for suppressing build-up formation in the polymerization processes of vinyl chloride or vinyl acetate, or mixtures thereof, in presence or in absence of other monomers or polymers polymerizable with them, which comprises coating the inner walls of a polymerization reactor with at least one of the build-up suppressing compositions of the invention.

The present invention further comprises a polymerization process of vinyl chloride or vinyl acetate, or mixtures thereof, in the presence or in the absence of other monomers or polymers polymerizable with them, effected in a reactor whose inner walls are coated with one or more of the compositions of the invention, and the polymers obtained by means of said process.

Finally, a further object of the present invention is a polymerization reactor whose inner walls are coated with one or more of the above build-up suppressing agents.

In components a), compound (A) can be any aldehyde capable of condensing at the ortho- and/or para-positions with respect to a hydroxyl present on an aromatic nucleus. Many aldehydes proved suitable to this purpose. Preferably, formaldehyde, or its precursors, such as paraldehyde or paraformaldehyde, aliphatic aldehydes having from 2 to 5 carbon atoms, benzaldehyde or heterocyclic aldehydes, such as, furfural are used. The phenol compound (B) can be any mono- or polyhydroxylated phenol in which at least two of the ortho- and/or para-positions to the hydroxy group(s) are free, for example, phenol, cresol, ethylphenol, resorcinol, pyrocathecol, hydroquinone, pyrogallol or bisphenol A, or a compound of formula (I). Phenol, resorcinol or compounds of formula (I) wherein m is 1 or 2, R and $R_1$ are as defined above and $R_1$, when it is different from hydrogen, is at the 7- or 8-positions are preferably used. Finally, compound (C) is a hydroxylated aromatic carboxylic acid of formula (II):

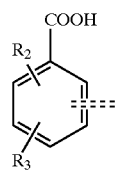

(II)

wherein $R_2$ is selected from the group consisting of hydrogen, hydroxy, $(C_{1-5})$ alkoxy, $(C_{1-5})$ alkyl, hydroxy $(C_{1-5})$ alkyl, halogen, phenyl and hydroxyphenyl; $R_3$ has the same meanings of $R_2$ with the exclusion of hydrogen; x and the dotted lines, taken together, represent either a divalent residue ortho-condensed with the benzene ring of formula (III):

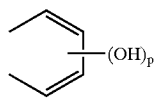

(III)

wherein p is an integer selected from 1 or 2, or they represent nothing; with the following provisos:
  i) when x and the dotted lines, taken together, represent the residue of formula III, at least two of the ortho- and/or para-positions to the hydroxyl group(s) are free;
  ii) when x and the dotted lines, taken together, represent nothing, at least one of $R_2$ or $R_3$ represents hydroxy, and at least two of the ortho- and/or para-positions to the hydroxyl group(s) are free.

Preferably, monohydroxy benzoic acids are used, such as salicylic acid and 4-hydroxy-benzoic acid, dihydroxy benzoic acids such as α-, β- and γ-resorcylic acids, 2,3-dihydroxy-benzoic acid, 2,5-dihydroxy-benzoic acid, monohydroxylated alkoxy benzoic acids, such as 2-hydroxy-5-methoxy-benzoic acid, hydroxynaphthoic acids, such as 6-hydroxy-2-naphthoic acid.

Components a) and the preparation thereof are disclosed, for example, in WO 98/24820 and in EP 0 052 541. Preferably, components a) derive from the condensation between formaldehyde, or a precursor thereof, and a resorcylic acid, subsequently condensed with 1-naphthol.

Alternatively, they are products deriving from the condensation between formaldehyde, or a precursor thereof, and 1-naphthol or 1,3-dihydroxynaphthalene.

Preferably, components b) are oxalic, malonic, succinic, maleic, malic, citric, tartaric, glutaric, glutamic, aspartic, acetylaspartic, adipic, phthalic, isophthalic, terephthalic and 2-bromosuccinic acids and the corresponding alkali metal salts thereof.

The ratios of components a) to b) which constitute the compositions of the present invention can range within very wide weight limits. In practice, it is preferable to use components a) in amounts ranging from about 50 to about 95% and components b) in amounts ranging from about 50 to about 5%, said values being referred to the total weight of components a) and b).

The compositions of the present invention are used, in principle, in the form of solutions. They can be prepared by mixing to homogeneity components a) and b) in any order of addition. By way of example, aqueous alkali solutions of components a) can be prepared separately, then components b) are added keeping the pH of the resulting composition within a range from about 8 to about 13.5.

Alternatively, a solid mixture of components a) and b) in the desired weight ratios is first prepared, which is then used to prepare an alkali aqueous solution with pH ranging from about 8 to about 13.5. Bases such as sodium or potassium hydroxide, ammonia, lower aliphatic amines, mono-, di- or triethanolamine, and the like can be used to adjust pH. Other procedures for preparing the solutions of the compositions of the invention are well-known to those skilled in the art. Solutions of the compositions of the invention in organic solvents can also be used.

For the purpose of favouring the adhesion of the compositions of the invention to those parts of the reactor or reaction system wherein it is desired that such adhesion occur, suitable surfactants or film forming agents, such as polyvinyl alcohols with a high hydroxyl number can be used. Polyvinyl alcohols having a degree of hydrolysis not lower than 96%, and a 4% water viscosity of 20 mPa.s or more, preferably 40 mPa.s or more, measured with a Hoppler viscometer, are preferred. If used, these surfactants or film forming agents are added to the compositions of the invention in amounts ranging from about 0.5% to about 20% by weight, calculated on the composition weight.

The concentration solutions in the compositions of the invention for use in the application on the walls of the reactor or, more in general, of the reaction system, can vary within wide limits. For example, it can be comprised between about 1 and about 15%, preferably between about 1 and about 9%; concentrations even lower than 1% proved to be equally effective. Such concentrations can be obtained according to conventional procedures.

The amount of the compositions of the invention which has to be applied on the walls of the reactors, or on the parts of the reaction systems in need, is particularly low. Usually, no more than 3 and not less than 0.01 grams of composition per $m^2$ of surface are sufficient, preferably up to no more than 2 g per $m^2$ and not less than 0.01 grams of composition per $m^2$ of surface.

The compositions of the invention can be applied to the walls of the polymerization reactor, or of the reaction system, in various different ways. For example, when said compositions are used in the form of alkali aqueous solutions, they are generally applied by means of the well known water vapour- or pressurized nitrogen-spraying technique, but they can also be applied by brushing or, in the case of vinyl chloride, using the monomer itself as carrier. The application can be carried out on cold or hot walls, using solutions previously heated or at room temperature, although the temperature is not critical.

The vinyl chloride or acetate polymerization mentioned in the present invention is either a homopolymerization or a copolymerization among them, in the presence or absence of one or more monomers or polymers polymerizable with them, such as other vinyl esters or aryl, alkyl or cycloalkyl esters of unsaturated mono- and polycarboxylic acids having 3–15 carbon atoms such as methyl acrylate, butyl methacrylate, acrylonitrile, methacrylonitrile, unsaturated diesters, such as diethyl maleate, allyl esters, such as allyl acetate, α-olefins, such as ethylene and propylene, vinyl ethers and styrene compounds. Moreover, the copolymerizations also comprise the polymerization of vinyl chloride in the presence of preformed polymers, optionally in the presence of grafting agents, to form grafted vinyl chloride polymers. Examples of these preformed polymers suitable for forming grafted vinyl chloride polymers comprise poly-2-ethylhexyl-acrylate, poly-n-butyl-acrylate and olefins/vinyl esters copolymers, such as ethylene/vinyl acetate copolymers.

The compositions of the present invention proved to be particularly effective in the case of aqueous suspension or aqueous emulsion polymerization, but also in the case of bulk polymerization a remarkable reduction of scales adhering to the walls was observed.

In the vinyl acetate and/or chloride suspension homo- and copolymerization, suspending agents having colloido-protective properties can also be used, such as for example partially hydrolyzed polyvinyl acetates, cellulose ethers, gelatin, sorbitol esters of fatty acids.

The used amounts generally vary between 0.05 and 2% by weight calculated on the total of the used monomers.

In the emulsion polymerizations, surfactants agents, such as polyglycol ethers of nonylphenol or sodium or ammonium salts of $C_{12}$–$C_{18}$ fatty acids, of alkylphosphates, of alkylsulfosuccinates, of alkylbenzene sulfonates, of sulfonated olefins, of sulfuric esters of fatty alcohols are used as emulsifiers.

The used amounts generally vary between 0.05 and 0.5% by weight calculated on the total used monomers.

Any suitable polymerization initiator, which is soluble in the used vinyl monomers can be employed. Examples of these polymerization catalysts are peroxides such as lauroyl peroxide, acetylcyclohexylsulfonyl peroxide, azo compounds, such as azobis(dimethylvaleronitrile) and peroxidicarbonates such as dicetyl peroxidicarbonate, diisopropyl peroxidicarbonate, and the like. These initiators and any other conventional agent can be used in the usual amounts of 0.01–1% w/w on the total of the monomers used. In the emulsion polymerizations, oil-soluble initiators can be used, such as diacyl or dialkyl peroxides such as lauroyl or benzoyl peroxide, per-esters such as t-butyl peroxipivalate or t-butyl per-2-ethylhexanoate, peroxidicarbonate or dicetyl peroxidicarbonate or hydrosoluble redox initiator systems based on persulfates, hydrogen peroxide, hydroperoxides combined with sodium metabisulfite, sodium formaldehyde sulfoxilate and the like.

The operating conditions for the polymerization are those well known in the art and usually employed for emulsion, suspension and bulk polymerizations of vinyl acetate and chloride, or of mixtures thereof, in the presence or absence of one or more monomers or polymers polymerizable with them.

The temperatures are in the range between 40 and 80° C. and the pressure is generally comprised between 5 and 14 bars for vinyl chloride, and between 65 and 95° C. and atmospheric pressure for vinyl acetate.

The following examples further illustrate the invention.

Preparation of the Compositions According to the Invention

EXAMPLE 1

250 g of the solution of the build-up suppressing agent as obtained in example 11 of WO 98/24820 are added with 50 g of citric acid, 2 g of polyvinyl alcohol having 96% degree of hydrolysis, then with sodium hydroxide to adjust pH to 10. The resulting mixture is stirred at room temperature until complete dissolution, to obtain a viscous solution.

EXAMPLE 2

500 g of the solution of the build-up suppressing agent as obtained in example 16 of WO 98/24820 are added with 50 g of sodium citrate. The resulting mixture is stirred at room temperature to homogeneity.

EXAMPLE 3

150 g of the solution of the build-up suppressing agent as obtained in example 1 of EP B1 0 052 421 are added with 2 g of polyvinyl alcohol having 96% degree of hydrolysis, then with 20 g of tartaric acid. The resulting mixture is stirred and added with a sodium hydroxide solution to obtain a viscous homogeneous solution.

EXAMPLE 4

500 g of the solution of the build-up suppressing agent as obtained in example 25 of WO 98/24820 are added with 8 g of citric acid and 10 g of polyvinyl alcohol having 96% degree of hydrolysis. The resulting mixture is stirred at room temperature, adjusting pH by addition of a sodium hydroxide solution, to obtain a homogeneous solution.

EXAMPLE 5

Operating substantially as described in examples 3 and 4, solutions of the compositions of the invention containing succinic, maleic, tartaric, glutaric, glutamic, aspartic, acetylaspartic, adipic, phthalic, and 2-bromosuccinic acid sodium salts were prepared.

EXAMPLES 6–13

Polymerization of the Vinyl Acetate Monomer (VAM) in Aqueous Suspension

In a 2.5 liter stainless steel reactor, equipped with reflux condenser and anchor stirrer, were loaded the following ingredients in parts by weight:

| | |
|---|---|
| VAM | 10 |
| Water | 5 |
| PVOH* (26/88) | 0.005 |
| Acetaldehyde | 0.04 |
| Benzoyl peroxide | 0.003 |

*PVOH: polyvinyl alcohol

The mixture was refluxed under atmospheric pressure and polymerization was carried out for 4 hours until a conversion not lower than 99% was attained.

Following this procedure, single polymerizations were carried out both in the absence and in the presence of the compositions of the present invention, and in the presence of the build-up suppressing agents of the prior art. The compositions of the present invention and the build-up suppressing agents of the prior art were applied in amounts of 0.3 g per $m^2$ of reactor surface by the spray technique. The build-up amount was determined after emptying and washing the reactor, by collection and weighing.

The results are reported in the following Table 1, and are expressed in parts per million (ppm) with repsect to the loaded monoeomer

TABLE 1

| Example | Composition of Example | Build-up (ppm) |
|---|---|---|
| 6 | — | 12400 |
| 7 | 3 | traces |
| 8 | 2 | none |
| 9 | 4 | none |
| 10 | Ex. 1 of WO 98/24820 | 325 |
| 11 | Ex. 8 of WO 98/24820 | 200 |
| 12 | Ex. 25 of WO 98/24820 | 180 |
| 13 | Ex. 1 of EP 54521 | 220 |

EXAMPLES 14–22

Polymerization of the Vinyl Chloride Monomer (VCM) in Aqueous Suspension

In a 2 liter stainless steel reactor, equipped with anchor stirrer, after removing oxygen, the following ingredients were loaded according the indicated weight ratios:

| | |
|---|---|
| VCM | 100 |
| Water | 150 |
| POLYVIC ® S 404 W | 0.04* |
| POLYVIC ® SP 808 | 0.04* |
| Methylhydroxypropylcellulose | 0.04 |
| Sodium hydrogencarbonate | 0.03 |
| Bis(4-tert-butylcyloheyl)peroxydicarbonate | 0.04 |

*as active in ingredient

The system was heated to 54° C., corresponding to an about 70 K value for the PVC polymer, while pressure increased to ⅞ ate, and polymerization was carried out for about 7 hours. When pressure decreased by 2–3 ate, the reaction was interrupted venting the unreacted monomer and recovering it.

Following this procedure, single polymerizations were carried out both in the absence and in the presence of the compositions of the present invention, and in the presence of the build-up suppressing agents of the prior art. The compositions and the build-up suppressing agents of the prior art were applied in amounts of 0.5 g per $m^2$ of reactor surface by the spray technique. The build-up amount was determined after emptying and washing of reactor, by collection and weighing.

The results are reported in the following Table 2, and are expressed in parts per million (ppm) with respect to the loaded monomers.

TABLE 2

| Example | Composition of Example | Build-up (ppm) |
|---|---|---|
| 14 | — | 7330 |
| 15 | 1 | none |
| 16 | 3 | none |
| 17 | 4 | none |
| 18 | Ex. 1 of WO 98/24820 | 55 |
| 19 | Ex. 8 of WO 98/24820 | 40 |
| 20 | Ex. 25 of WO 98/24820 | 40 |
| 21 | Ex. 1 of EP 54521 | 70 |
| 22 | Ex. 11 of EP 54521 | 60 |

EXAMPLES 23–29

The same polymerization as in the above Example was performed four consecutive times, both in the absence and in the presence of the compositions of the present invention, and in the presence of the build-up suppressing agents of the prior art. The compositions and the build-up suppressing agents of the prior art were applied in amounts of 0.5 g per $m^2$ of reactor surface by the spray technique only once before the first polymerization. The build-up amount was determined after emptying and washing the reactor, by collection and weighing.

The results are reported in the following Table 3, and are expressed in parts per million (ppm) with respect to the loaded monomer.

TABLE 3

| Example | Composition of Example | Build-up (ppm) |
|---|---|---|
| 24 | — | 7330 |
| 25 | 2 | traces |
| 26 | 4 | traces |
| 27 | Ex. 8 of WO 98/24820 | 60 |
| 28 | Ex. 27 of WO 98/24820 | 75 |
| 29 | Ex. 1 of EP 54521 | 90 |

What is claimed is:

1. A build-up suppressing composition, comprising a mixture of:

a) at least one product deriving from the condensation of an aldehyde (A), a phenol compound (B) and an aromatic carboxylic acid hydroxylated on the aromatic nucleus (C); or at least one product deriving from the condensation between formaldehyde, or a precursor thereof, and a compound of formula (I)

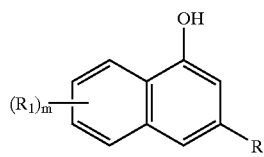

in which m is 1, 2 or 3, and R and $R_1$ are independently selected from the group consisting of hydrogen, halogen, $(C_{1-5})$alkyl, hydroxyl and carbo$(C_{1-5})$alkoxyl; in admixture with b) at least one polycarboxylic acid, optionally having on the non carboxylic carbon atoms 1 to 3 radicals independently selected from the group consisting of halogen atoms and the groups O—$R_4$ and NH—$R_5$, in which $R_4$ and $R_5$ are independently hydrogen, $(C_{1-6})$ alkyl or a $C_1$–$C_6$ acyl group, or the alkali metal salts thereof.

2. The composition of claim 1, wherein the aldehyde in component a) is an aldehyde capable of condensing at the ortho- and/or para-positions to a hydroxyl on an aromatic nucleus.

3. The composition of claim 1, wherein the phenol compound in component a) is a mono- or polyhydroxylated phenol in which at least two of the ortho- and/or para-positions to the hydroxyl(s) are free, or is a compound of formula (I).

4. The composition of claim 1, wherein the aromatic carboxylic acid hydroxylated on the aromatic nucleus in component a), is a compound of formula (II)

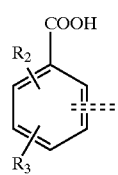

wherein $R_2$ is selected from the group consisting of hydrogen, hydroxy, $(C_{1-5})$ alkoxy, $(C_{1-5})$ alkyl, hydroxy $(C_{1-5})$ alkyl, halogen, phenyl and hydroxyphenyl; $R_3$ has the same meanings as $R_2$ with the exclusion of hydrogen; x and the dotted lines, taken together, can represent either a divalent residue ortho-condensed with the benzene ring of formula (III):

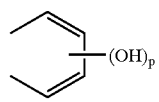

wherein p is an integer which is 1 or 2, or they represent nothing; with the following provisos:
i) when x and the dotted lines, taken together, represent the residue of formula III, at least two of the ortho- and/or para-positions to the hydroxyl group(s) are free;
ii) when x and the dotted lines, taken together, represent nothing, at least one of $R_2$ or $R_3$ represents hydroxy, and at least two of the ortho- and/or para-positions to the hydroxyl group(s) are free.

5. The composition of claim 1, wherein components a) are compounds from the condensation between formaldehyde, or a precursor thereof, and a resorcylic acid, subsequently condensed with 1-naphthol.

6. The composition of claim 1, wherein components a) are compounds from the condensation between formaldehyde, or a precursor thereof, and 1-naphthol.

7. The composition of claim 1, wherein components b) are oxalic, malonic, succinic, maleic, malic, citric, tartaric, glutaric, glutamic, aspartic, acetylaspartic, adipic, phthalic, isophthalic, terephthalic, or 2-bromosuccinic acids or the alkali metal salts thereof.

8. The composition of claim 1, wherein components a) are present in amounts ranging from about 50 to about 95% and components b) in amounts ranging from about 50 to about 5%, said values being calculated on the total weight of both components a) and b).

9. The composition of claim 1, in the form of liquid solutions.

10. The composition of claim 9, in the form of alkali aqueous solutions.

11. A method for suppressing build-up formation in the polymerization processes of vinyl chloride or vinyl acetate, or of mixtures thereof, in the presence or in the absence of other monomers or polymers polymerizable therewith, which comprises coating the inner walls of a polymerization reactor the composition as claimed in claim 1.

12. A polymerization process of vinyl chloride or vinyl acetate, or of mixtures thereof, in the presence or in the absence of other monomers or polymers polymerizable therewith, carried out in a reactor whose inner walls are coated by the composition as claimed in claim 1.

13. A polymerization reactor whose inner walls are coated with the composition as claimed in claim 1.

* * * * *